US009160445B2

(12) United States Patent
Mu et al.

(10) Patent No.: US 9,160,445 B2
(45) Date of Patent: *Oct. 13, 2015

(54) METHOD AND SYSTEM FOR FAULT RECOVERY IN AN OPTICAL NETWORK

(71) Applicant: Tyco Electronics Subsea Communications LLC, Eatontown, NJ (US)

(72) Inventors: Ruomei Mu, East Brunswick, NJ (US); Ekaterina A. Golovchenko, Colts Neck, NJ (US); Franklin Webb Kerfoot, III, Red Bank, NJ (US)

(73) Assignee: TYCO ELECTRONICS SUBSEA COMMUNICATIONS LLC, Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,121

(22) Filed: Oct. 23, 2014

(65) Prior Publication Data
US 2015/0063797 A1 Mar. 5, 2015

Related U.S. Application Data

(63) Continuation of application No. 13/181,992, filed on Jul. 13, 2011, now Pat. No. 8,891,957.

(51) Int. Cl.
*H04B 10/00* (2013.01)
*H04B 10/03* (2013.01)
(Continued)

(52) U.S. Cl.
CPC .......... *H04B 10/03* (2013.01); *H04B 10/07953* (2013.01); *H04B 10/07955* (2013.01); *H04B 10/80* (2013.01); *H04J 14/0268* (2013.01); *H04J 14/0201* (2013.01)

(58) Field of Classification Search
CPC ........... H04B 10/032; H04B 10/07955; H04B 10/0775; H04B 2210/08; H04B 10/0771; H04B 10/07953; H04B 10/03; H04B 1/07; H04J 14/0293; H04J 14/029; H04J 14/0295; H04J 14/0283; H04J 14/0227; H04Q 2011/0081
USPC .............................. 398/10, 5, 17, 25, 38, 1, 2
See application file for complete search history.

(56) References Cited

U.S. PATENT DOCUMENTS 6,194,707 B1 * 2/2001 Yang .................... 250/227.15
6,421,149 B2 * 7/2002 Tervonen et al. ............ 398/9
(Continued)

FOREIGN PATENT DOCUMENTS

EP      1553710 A1    7/2005
WO   2010107017 A1    9/2010

OTHER PUBLICATIONS

Optical Performance Monitoring D. C. Kilper, R. Bach, D. J. Blumenthal, D. Einstein, T. Landolsi, L. Ostar, M. Preiss, and E. Willner, Senior Member, IEEE a.*
(Continued)

*Primary Examiner* — Hibret Woldekidan
(74) *Attorney, Agent, or Firm* — Kacvinsky Daisak Bluni PLLC

(57) ABSTRACT

A system for fault recovery in an optical network may include an initial loading equipment (ILE) apparatus configured to supply power to a set of channels over a first communications link of the optical network, the set of channels including data channels and spare channels, and a control system configured to detect an optical power level over the data channels of the first communications link and determine whether a Q-factor corresponding to the data channels of the first communications link is below an error correction threshold, the control system configured to alert the ILE apparatus to adjust its optical power output over the spare channels upwardly based on the determination that the Q-factor is below the error correction threshold to increase the Q-factor.

10 Claims, 4 Drawing Sheets

(51) Int. Cl.
*H04B 10/079* (2013.01)
*H04B 10/80* (2013.01)
*H04J 14/02* (2006.01)

(56) References Cited

U.S. PATENT DOCUMENTS

| | | | | |
|---|---|---|---|---|
| 6,628,871 | B2* | 9/2003 | Maroney et al. | 385/123 |
| 6,735,391 | B2* | 5/2004 | Lee et al. | 398/3 |
| 7,289,728 | B2* | 10/2007 | Wang et al. | 398/5 |
| 7,289,734 | B2* | 10/2007 | Ng et al. | 398/94 |
| 7,941,047 | B2* | 5/2011 | Zhou et al. | 398/15 |
| 8,358,929 | B2* | 1/2013 | Lewis et al. | 398/19 |
| 8,891,957 | B2* | 11/2014 | Mu et al. | 398/5 |
| 2002/0149810 | A1* | 10/2002 | Brown et al. | 359/110 |
| 2003/0185562 | A1* | 10/2003 | Feinberg et al. | 398/5 |
| 2005/0152693 | A1* | 7/2005 | Grand et al. | 398/27 |
| 2007/0183776 | A1 | 8/2007 | Stuart et al. | |
| 2008/0175587 | A1* | 7/2008 | Jensen | 398/2 |
| 2008/0279550 | A1* | 11/2008 | Mahlab | 398/25 |
| 2009/0142069 | A1* | 6/2009 | Wree et al. | 398/147 |
| 2009/0190207 | A1* | 7/2009 | Watanabe | 359/341.3 |
| 2009/0269053 | A1* | 10/2009 | Yang | 398/22 |
| 2011/0026925 | A1* | 2/2011 | Mu et al. | 398/79 |
| 2011/0116786 | A1* | 5/2011 | Wellbrock et al. | 398/2 |
| 2011/0226925 | A1* | 9/2011 | Tsai | 248/411 |
| 2011/0311216 | A1 | 12/2011 | Inoue | |
| 2012/0087658 | A1* | 4/2012 | Jander | 398/48 |
| 2014/0099098 | A1* | 4/2014 | Wang et al. | 398/7 |

OTHER PUBLICATIONS

International Search Report, International Application No. PCT/US2012/045579, International Mailing Date Jan. 16, 2015.

* cited by examiner

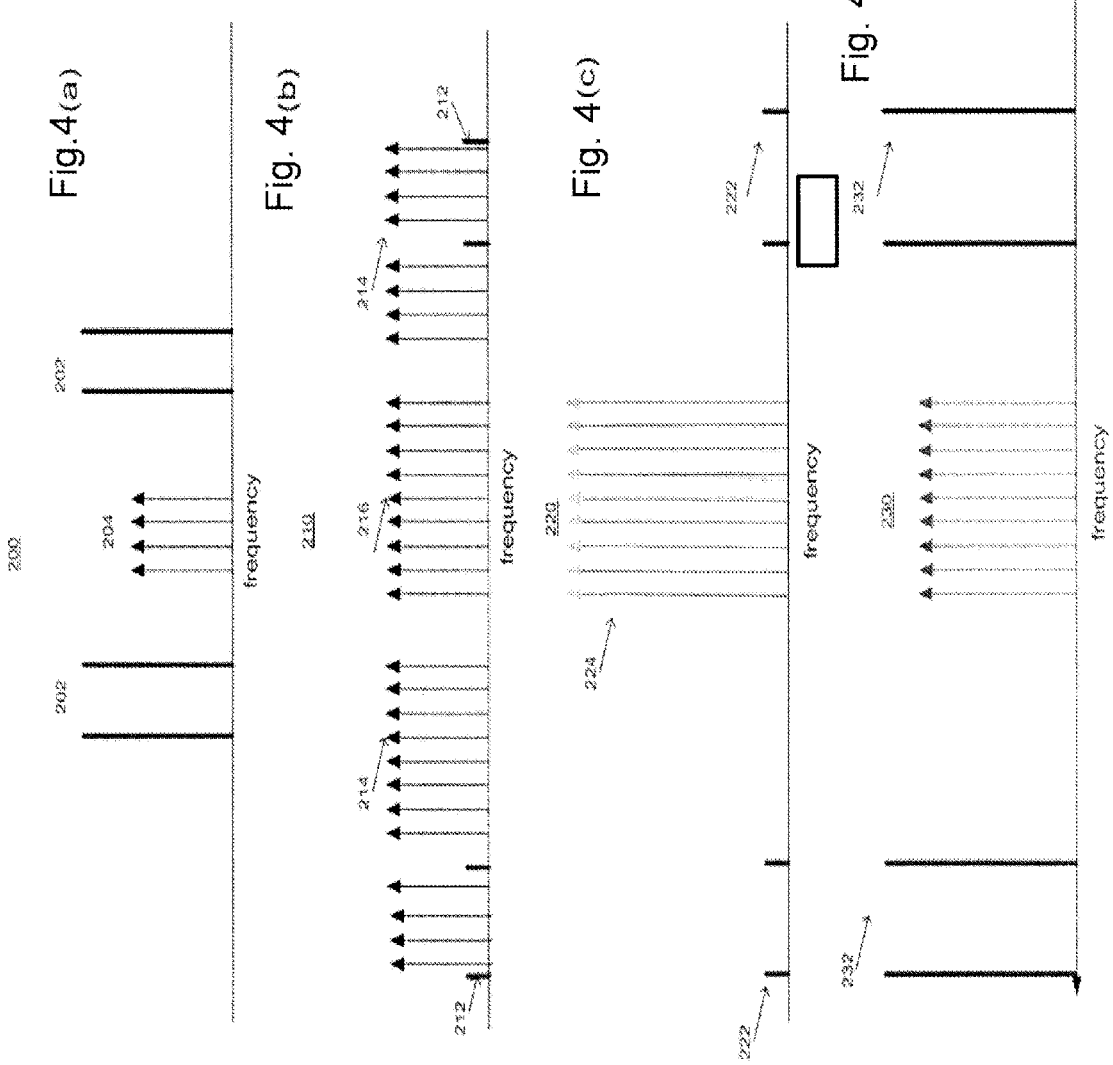

METHOD AND SYSTEM FOR FAULT RECOVERY IN AN OPTICAL NETWORK

CROSS REFERENCE TO RELATED APPLICATION

This application is a continuation and claims the benefit of U.S. patent application Ser. No. 13/181,992 filed Jul. 13, 2011, entitled "Method and System for Fault Recovery in a Branched Optical Network" which application is incorporated herein by reference in its entirety.

BACKGROUND OF THE INVENTION

1. Field of the Invention

Embodiments of the present disclosure relate to the field of optical communication systems. More particularly, the present disclosure relates to a method and system for fault recovery in trunk and branch optical add/drop multiplexing (OADM) networks.

2. Discussion of Related Art

Undersea fiber optic communication systems may include a main trunk path extending between land-based cable stations and one or more branch segments connected thereto. The main trunk is defined by an undersea cable having a plurality of optical fibers therein and one or more repeaters or optical amplifiers disposed along the trunk path used to amplify optical signals transmitted between the cable stations. Each cable station includes terminal equipment used to transmit and receive these optical signals along the main trunk path. The one or more branch segments are coupled to the trunk through a branching unit (BU) at one end and to a branch segment cable station at another end. These systems are referred to as trunk and branch networks. Trunk cable stations may be used to carry information signals through the backbone of the network while the branch segments may be used to transmit or receive traffic between the trunk paths to the branch cable stations. The optical signals transmitted between the trunk and branch cable stations are typically dense wavelength-division multiplexed (DWDM) signals in which a plurality of optical channels, each at a respective wavelength, are multiplexed together.

Historically long haul undersea trunk-and-branch networks have been used to provide connectivity between cable stations by using dedicated fiber pairs. A more recent architecture, employs optical add/drop multiplexers (OADMs) to provide a more flexible distribution of transmission connectivity in comparison to technologies using fiber pairs. In general, an OADM node is used to add and/or drop channels within a DWDM optical signal between the trunk and branch segments. The advantages of utilizing OADMs, in part, stems from the ability to share capacity of dedicated fiber pairs among multiple network branches.

In typical optical trunk and branch network configurations, not all the system bandwidth is utilized at initial deployment. Consequently, the initially deployed data channels may experience higher optical power which may cause system performance degradation. In these cases, initial loading equipment (ILE) is employed to transmit non-payload carrying signals within the system bandwidth or transmission spectrum between cable stations. In other words, the ILE may be used to fill up un-used capacity of the network before most or all system bandwidth are deployed as payload channels.

ILE may transmit and receive discrete tones which are referred to as discrete tone initial loading equipment (DT-ILE). Subsequently, as each payload data channel is being added into the network, the ILE is replaced by optical terminal equipment which transmit/receive payload channels within the network. Thus, depending on the amount of system bandwidth used for data transmission, the ILE may consume more or less portions of repeater power in the system until all system bandwidth are utilized by data traffic in the network. In the case of DT-ILE, this power consumption may take place over particular frequencies or wavelengths that may border on the high and/or low range of channel frequencies used for payload transmission. As a result, the insertion of the ILE signals may also serve the purpose of power management in the optical network to ensure the installed data channels are at a preferred power level.

In OADM trunk and branch networks, optical power management remains a challenge, especially when a cable fault occurs. Cable faults that interrupt traffic, such as cable cuts, can cause transmission loss between cable stations. This incidence can lead to severe optical power changes with remaining optical channels in the network. FIG. 1 illustrates a conventional and simplified OADM trunk and branch network 10 including trunk cable stations or terminals 12 and 14 connected via trunk path 16. Branching units 18 and 20 couple branch cable stations or branch terminals 30 and 32 to trunk path 16 through respective branch segments 34 and 36. Each of the branching units 18 and 20 include OADM nodes used to add/drop channels propagating between trunk path 16 to branch segments 34 and 36. Trunk path 16 is defined by an optical cable having a plurality of optical fiber pairs, optical amplifiers 16$a$, 16$a$1, 16$b$, 16$b$1, 16$c$, 16$c$1 disposed along the optical cable as well as other optical/electrical equipment used to transmit optical signals along the trunk path 16 from between terminals 12 and 14. Typically, the optical signals or "through traffic" travel along trunk 16 between terminals 12 and 14, whereas signals destined for branch terminals 30 and 32 are added/dropped from the trunk 16 using OADM nodes in branching units 18 and 20 respectively. For each fiber pair along trunk 16 there are two corresponding fiber pairs within each branch segment 34, 36 in order to provide transmission capacity in both directions to/from branching unit 18 and branch terminal 30 as well as in both directions to/from branching unit 20 and branch terminal 32 thereby supporting connectivity between all terminals 12, 14, 30 and 32.

If system 10 is fully loaded and a cable cut 40 occurs along branch 34, the cut may result in an optical power surge associated with the channels between terminals 12 and 14 in order to maintain the level of optical power over the system within a preset range. FIG. 2 depicts possible optical power spectra that may be detected at terminal 12 during system operation before a cut (50) and after a cut (52). In this example, data channels (represented by portion 54) are allocated for the traffic between station 30 and 14. Data channels (represented by portion 56) are allocated for the traffic between station 12 and 14. The signal power level 50 before a cut 40 may correspond to a level in which optical signals are properly transmitted along trunk path 16 without error or with an error rate within acceptable limits. When the cut 40 occurs, data channels 54 will be out of service because of the discontinuity of the fiber path for data channels 54. Meanwhile, data channels 56 remain propagating in the trunk path 16 with an increased power level. However, if after cut 40 occurs, the optical signal power level 52 for data channels 56 exceed a level at which optical signals can be properly transmitted between terminals 12 and 14, disruption of payload traffic in data channels 56 in system 10 may result in trunk path 16. In view of the above it will be apparent that a need exists to remedy undersea OADM networks when a cable fault occurs, referred as OADM fault recovery.

SUMMARY OF THE INVENTION

Embodiments of the present disclosure are directed to systems and methods for management of traffic during fault recovery in optical OADM networks. In one embodiment, a system for fault recovery in an optical network includes an initial loading equipment (ILE) apparatus configured to supply power to a set of channels over a first communications link of the optical network. The system further includes a control system configured to detect an optical power level over data channels of the first communications link, wherein the control system is configured to alert the ILE apparatus to adjust its optical power output upwardly when the optical power level over the data channels is determined to exceed a first threshold.

BRIEF DESCRIPTION OF THE DRAWINGS

FIG. 4a illustrates an exemplary optical power distribution showing the spectral position and power over ILE channels in a DT-ILE system, as well as data channels during initial loading conditions of a communications link.

FIG. 4b illustrates the spectral position and optical power of signals generated by the DT-ILE and data channels after upgrade of the communications link of FIG. 4a.

FIG. 4c illustrates the instantaneous distribution of optical power across data channels and DT-ILE channels of the communications link of FIG. 4b that may occur after a cut in a line of an OADM system.

FIG. 4d depicts distribution of optical power across channels of the communications link of FIG. 4c after adjustment consistent with embodiments of the present disclosure.

DESCRIPTION OF EMBODIMENTS

Figure 1:
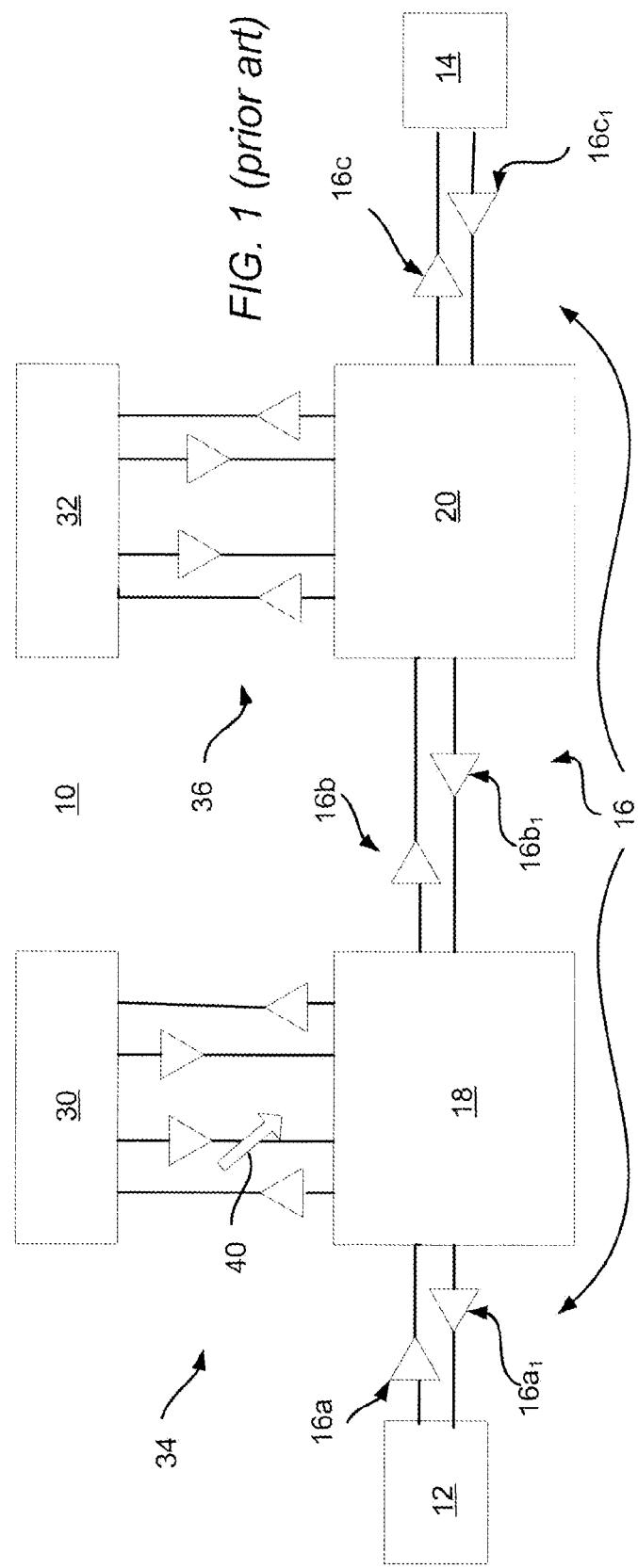
FIG. 1 is a schematic depiction of a known branched optical network.
Figure 2:
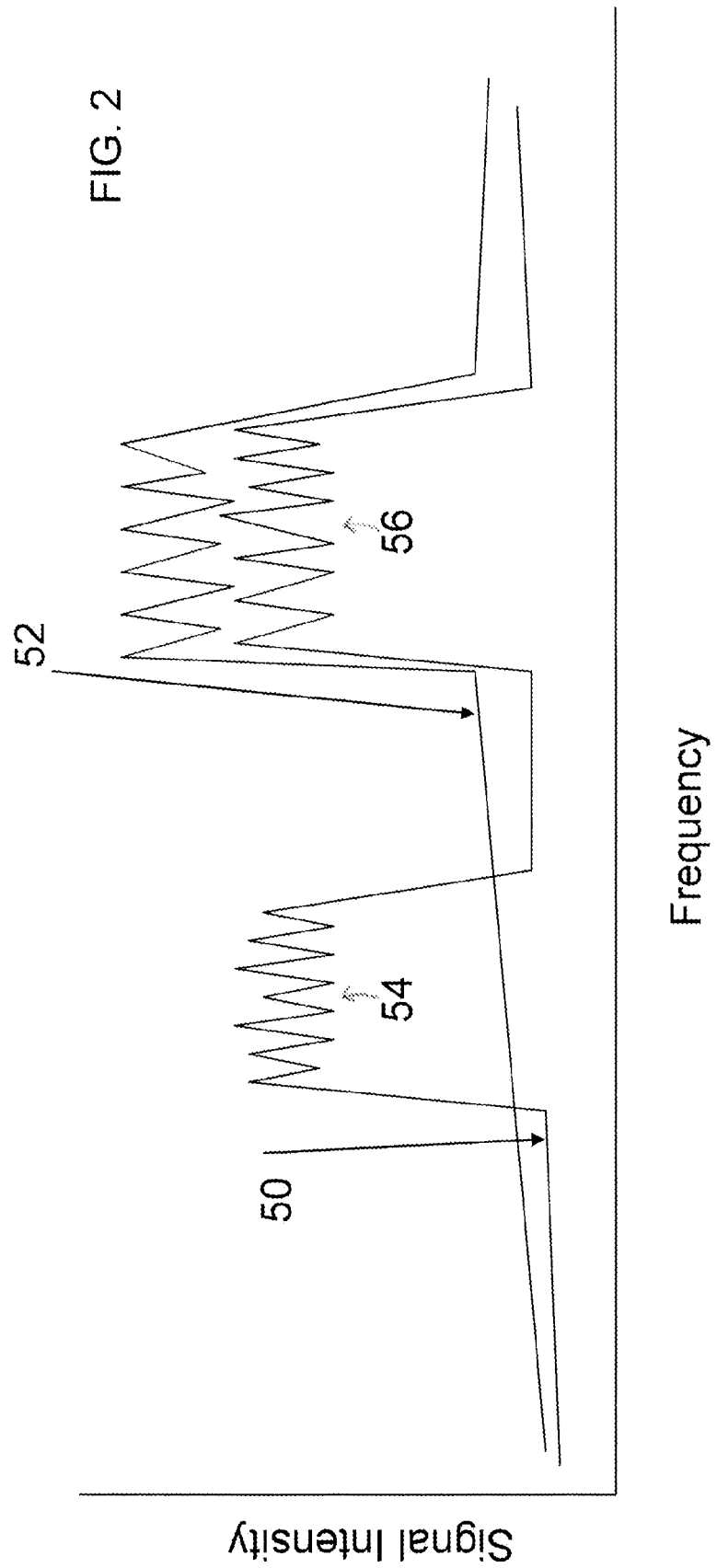
FIG. 2 depicts an optical power spectrum over a communications link of the branched optical network of FIG. 1 before and after a cut in another communications link.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

To solve the deficiencies associated with the methods noted above, novel and inventive techniques for managing optical communication systems and in particular, fault recovery in a branched OADM optical network due to one or more cable cuts is disclosed.

Figure 3:
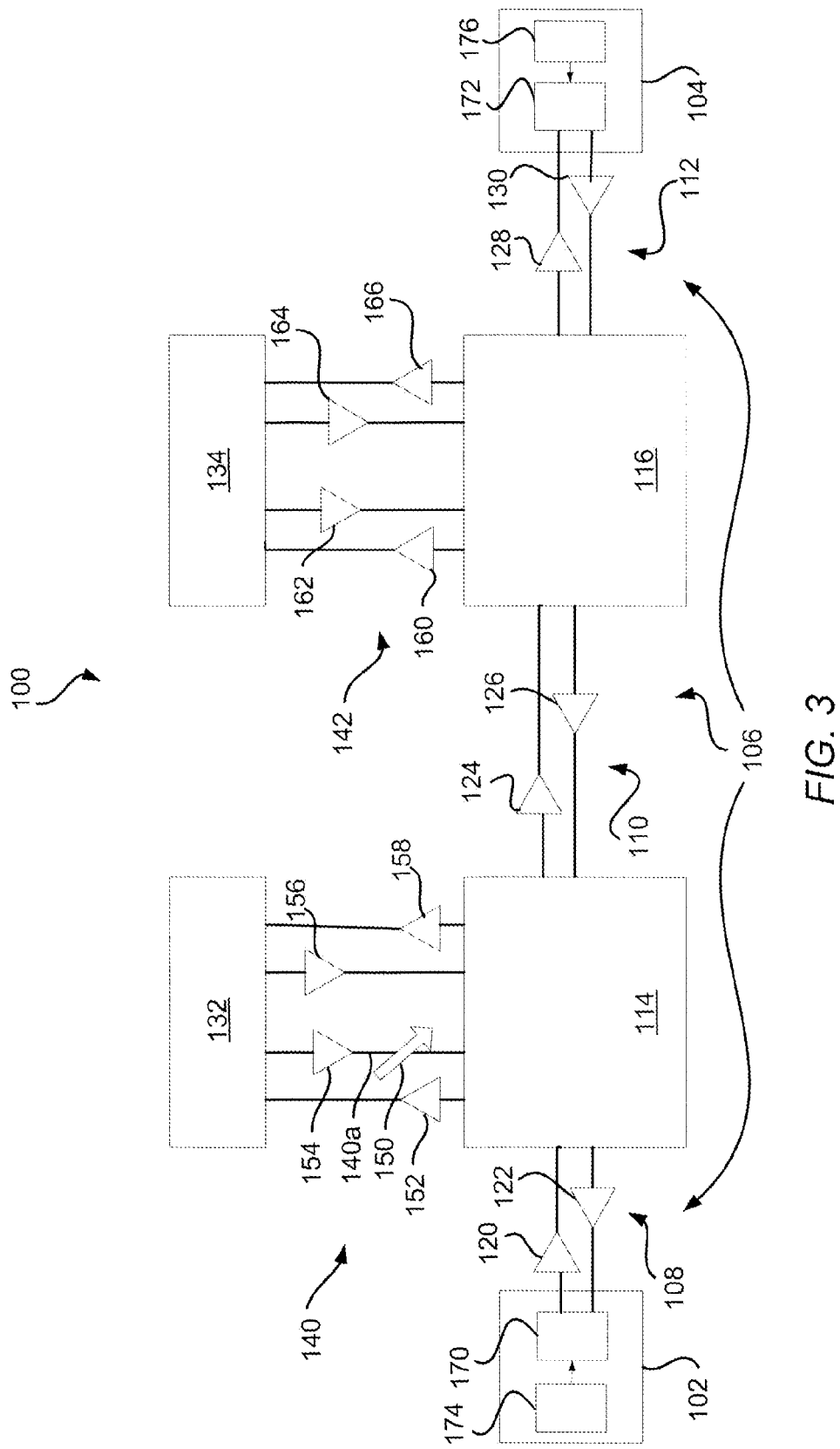
FIG. 3 presents a schematic depiction of a branched optical network consistent with an embodiment of the disclosure.

Referring to the drawings, FIG. 3 illustrates an embodiment of an OADM system 100. The OADM system 100 may be an optical communication system, such as a subsea communications system. As depicted, OADM system 100 includes trunk terminals (cable stations) 102, 104 that are coupled to opposite ends of a trunk path 106. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals. The trunk path 106 may include optical fiber in a plurality of optical cable segments, e.g. cable segments 108, 110, and 112, for carrying optical signals. Each cable segment may include one or more sections of optical fiber cable including optical fiber pairs for carrying bi-directional signals, as well as one or more amplifiers. In the example shown, cable segment 108 includes amplifiers 120,122, cable segment 110 includes amplifiers 124,126, and cable segment 112 includes amplifiers 128,130. It will be readily appreciated by those of ordinary skill that the trunk path 106 may include additional amplifiers depending on its length.

In various embodiments one or more branching units such as branching units 114,116 may be coupled to the trunk path 112 between the trunk terminals 102 and 104, and may include optical add/drop multiplexer (OADM) apparatus (not separately shown). Accordingly, units 114 and 116 may also be referred to herein as "OADM node 114" or "OADM node 116". Each OADM node 114,116 may be further coupled to a branch terminal, e.g., respective branch terminals 132,134, through a respective branch path 140,142.

In operation, the branching units 114,116 may direct optical signals to and from the respective branch paths 140,142 and branch terminals 132,134 by dropping and adding allocated channel wavelengths. The branch paths 140,142 may also include optical fiber in optical cable segments to provide a transmission path for bi-directional communication of optical signals. The system 100 may therefore provide bi-directional communication of optical signals between any of the terminals 102, 104, 132, and 134. For ease of explanation, the description herein may refer to transmission from one terminal to another. It is to be understood, however, that the system 100 may be configured for bi-directional or uni-directional communication between any number of the terminals 102, 104, 132, and 134. Similar to the trunk path 106, the branch paths 140,142 may further include one or more amplifiers, as discussed below. In various embodiments, the trunk path and branch paths of an OADM system may each contain one or more communications links. The term "communications link" as used herein may refer to a unidirectional or bidirectional optical link over one or more optical fibers, that lie anywhere within the branched optical network. The operation of OADM nodes 114 and 116 may be in accordance with known OADM apparatuses. OADM node 114, for example, may add/drop data channels for transmission, for example, along trunk path 106.

As illustrated in FIG. 3, branch path 140 may include amplifiers 152, 154, 156, 158, while branch path 142 includes amplifiers 160, 162, 164, 166. System 100 also includes one or more ILE units 170,172 which may be deployed at respective trunk stations 102,104 as shown in FIG. 3. In some embodiments, one or more ILE is configured to continue operation even when one or more communications links of a path, such as trunk path 106, are fully loaded with data traffic. In various embodiments, a discrete tone ILE unit (DT-ILE), which employs lasers to provide discrete laser tones at desired frequencies, may be located in one or more stations 102, 104, 132, and 134. Except as otherwise noted herein, the DT-ILE may have conventional components and structure, such as laser(s) that may produce one or more tones at discrete wavelengths (frequencies) for which the optical power at each wavelength can be adjusted. The DT-ILE tones may be transmitted over an optical link together with optical data signals, as described further below.

In the embodiment depicted in FIG. 3, a DT-ILE unit 170,172 is deployed within each of respective terminals 102, 104. System 100 further includes ILE control systems 174, 176, which may be deployed in respective trunk terminals 102 and 104, as illustrated. An ILE control system, such as ILE control system 174, may dynamically adjust operation of an associated ILE, such as ILE 170, in response to changes, such as fault occurrences, in OADM system 100. In some embodiments, a single control system may control more than one ILE.

In operation, one or more ILE units may perform multiple functions to aid in optical communications across system 100. During initial stages of deployment, the ILE may function to load unused optical spectrum with signals that have power density to produce a desired total optical power over a communication link in system 100. FIG. 4a illustrates an exemplary optical power distribution 200 over a communications link, which includes a DT-ILE optical power distribution 202 in a DT-ILE system, as well as a data channel optical power distribution 204, that may be representative of during initial loading conditions. As illustrated, there are large portions of empty spectrum that are not used for data communication. In this case, the optical power generated by the DT-ILE is relatively strong to compensate for the lack of occupied spectrum by data channels, which produce a required optical power distribution 204. During upgrade of a system, the spectral position occupied by signals generated by the DT-ILE may shift to compensate for new data channels that may occupy the frequency formerly used by the DT-ILE, as depicted in optical power distribution 210 of FIG. 4b. The data channels occupy a fuller range of spectrum in FIG. 4b and output a larger optical power distribution 214, which requires that the DT-ILE channels be placed at other frequencies, as illustrated. For example, the DT-ILE channels may occupy other unused spectrum or guard band regions. In addition, the optical power distribution 212 from the DT-ILE may be reduced from that employed during the initial loading conditions illustrated in FIG. 4a, so that the total optical power across the spectrum used for an OADM system falls within a designed range. Thus, when the system channels are fully or nearly fully loaded with data traffic, the DT-ILE may be tuned down to a minimal power and may occupy any portion of the data channel spectrum or guard band region of the spectrum.

After a communication link is fully loaded, in various embodiments, the DT-ILE equipment is configured to remain active, even if the optical power output by the DT-ILE is maintained at a minimum level to limit its interaction with data channels. In these circumstances, the DT-ILE, such as ILE 170,172, may act as a system for fault recovery in an OADM network.

As noted, under fully loaded conditions, an ILE may remain deployed but may be tuned down to a minimal power and may have its output channels placed in a preferable position within the data channels or guard band region of the spectrum. However, the OADM system may be configured to dynamically adjust the optical power output of an ILE to respond to changes in data channels, so that the optical power along given trunk and/or branch paths remains within an acceptable range. For example, referring again to FIG. 3, if a cable cut 150 occurs along line 140a between stations 132 and 114, the loss of optical signals along line 140a caused by the cable cut 150 may result in an optical power surge along other paths of system 100, for example, between terminals 102 and 104.

FIG. 4c illustrates the instantaneous optical power distribution 220 that may occur after a cut in a line of an OADM system such as cut 150. For example, this spectrum may be detected at terminal 102. An optical power increase, as reflected in data channel optical power distribution 224, may result automatically from conventional OADM network equipment that is configured to maintain the total optical power in a network within a proper range. For example, amplifiers within the OADM network 100 may be configured to maintain optical power over the trunk path 106 within a desired range. Thus, a cut in data cable in one portion of the OADM network may instantaneously reduce overall optical data channels to the extent that the optical power in remaining data channels of undamaged portions of the network is automatically increased to offset the power loss in the damaged portion. However, optical power output in an undamaged link, represented by the data channel optical power distribution 224, may be above a range in which data can be properly transmitted and received, resulting in a loss or degradation of communication over the "undamaged" link. For example, referring again to FIG. 3, the cut 150 over line 140a may result in degrading or extinguishing communications between trunk station 102 and other stations in the OADM network 100 if the resultant optical power distribution 224 is too high.

In order to address this situation, in embodiments of the present disclosure, a DT-ILE may adjust its operation in response to a detected traffic loss due to optical power increase over data channels of a communications link. In various embodiments the control system 174 is configured to send a signal to DT-ILE 170 to adjust its power upwardly in response to a detected increase in optical power over designated frequencies of data channels. Thus, when a condition corresponding to the data channel optical power distribution 224 is detected, control system 174 may determine that the optical power level is too high for proper communications. In order to reduce the data channel optical power distribution 224 to the acceptable level, the control system 174 is configured to send a signal to a DT-ILE of system 100 to adjust the DT-ILE optical power output in DT-ILE channels upwardly. The DT-ILE then may increase power for predetermined frequencies to a higher value, resulting in an adjusted optical power distribution 232 over the DT-ILE channels, as shown in FIG. 4d.

Once the optical power distribution 232 is output from a DT-ILE, the OADM system may automatically adjust the optical power of data channels downwardly so that the total optical power over a given communications link remains within a predetermined range. The resulting data channel optical power distribution 234 may then fall within an acceptable range for communications. It is to be noted, however, that the optical power distribution 234 in FIG. 4d need not be the same as that of optical power distribution 214 in FIG. 4b, as long as the optical power output is within an acceptable range for data to be effectively transmitted.

Thus, in accordance with embodiments of the disclosure, a "tuned up" DT-ILE may output a relatively higher optical power over a communication link, such as a fully loaded trunk path, during a period of fault recovery in an OADM system. Once fault recovery is complete, such as after repairing a cable cut, the power output of the DT-ILE may be tuned down to a "warm" stage again in which optical power output is minimal, according to known operation of a DT-ILE in an OADM system.

The control systems, such as control system 174, may be at least partially implemented as a program of instructions on a non-transitory computer readable storage medium capable of being read by a machine capable of executing the instructions. Thus, the control system 174 may execute a program that has as an input, the optical power level of data channels of a communication link in question. The program may be configured to determine one or more actions based upon the optical power level, and to output the appropriate control signals. In various embodiments, the control system may be embodied in one or more computer chips that may be included within an ILE, such as DT-ILE 170,172, or may be included at any convenient location of a branched optical network.

In various embodiments, the determination that optical power is excessive on a given communication link may be made by monitoring channels performance of the communication link. In some embodiments, the Q-factor of a predetermined set of data channels may be monitored to determine when the optical power is excessive. In some embodiments, if the Q-factor is below a forward error correction (FEC) threshold, a determination may be made that the optical power is too high, which may trigger the control system 174 to send a signal to the DT-ILE to increase output power of the DT-ILE. In some embodiments, the increase in power of the DT-ILE may be done in an iterative fashion. For example, one or more subsequent scans may be performed to measure whether the Q-factor of all or selected data channels are above an FEC threshold, and, if not, a signal is sent to increase output power of the DT-ILE.

In one specific example, if the optical power of data channels is initially determined to be too high, the control system 174 may send an initial instruction to DT-ILE 170 to adjust its optical power output by a predetermined amount. Once the DT-ILE optical power output increases by the predetermined amount, other apparatus within the OADM system (such as amplifiers) may automatically adjust the optical power of data channels of the communications link downwardly to a new level based upon the adjusted optical power output of the DT-ILE. If the control system 174 determines that the new level is still too high, the control system may send a second alert to the DT-ILE 170 to adjust its optical power output to a still higher level, and so forth, until the optical power of the data channels is deemed to fall within an acceptable range. As noted above, this determination may be made by measuring a Q-factor, among other ways.

Although the above embodiments specifically depict deployment of ILE apparatus in trunk paths of OADM network, embodiments in which ILE apparatus are deployed at any or all terminals of a branch network are possible. Furthermore, a control system that controls power output of an ILE used for fault recovery as described hereinabove need not be located at the same terminal as the ILE under control. Since the control systems may be embodied in software routines and/or programmed into hardware, control systems may be conveniently added and deployed wherever convenient for controlling optical output over desired communications links of the OADM system.

Herein, novel and inventive apparatus and techniques for monitoring and adjusting optical output power in communication paths of OADM systems during fault period are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for fault recovery in a terminal of an optical network, comprising:
an initial loading equipment (ILE) apparatus configured to supply power to a set of channels over a first communications link of the optical network, the set of channels including data channels and spare channels; and
a control system configured to detect an optical power level over the data channels of the first communications link and determine whether a Q-factor corresponding to the data channels of the first communications link is below an error correction threshold, the control system configured to send a first alert the ILE apparatus to adjust its optical power output over the spare channels upwardly based on the determination that the Q-factor is below the error correction threshold to increase the Q-factor.

2. The system of claim 1, wherein the ILE apparatus and control system are located at a common terminal of the optical network.

3. The system of claim 1, wherein the ILE is configured to adjust its output power upwardly over the spare channels until the optical power level over the data channels no longer exceeds a first threshold.

4. The system of claim 1, wherein the set of channels are guard band channels that surround the data channels.

5. The system of claim 1, wherein the control system is configured to control the adjusting of optical power output of the ILE in an iterative fashion.

6. The system of claim 1, wherein the optical network is an OADM subsea communications network.

7. The system of claim 1, wherein the control system is configured to reduce power output of the ILE when the first communications link is fully loaded with data traffic relative to power output of the ILE during an initial loading condition.

8. The system of claim 1, wherein the ILE apparatus is configured to remain active after the first communications link is fully loaded with data traffic.

9. The system of claim 1, wherein the control system is further configured to send a second alert to the ILE apparatus to adjust its optical power output over the spare channels further upwardly based on the determination that the Q-factor is, after sending the first alert, still below the error correction threshold to increase the Q-factor.

10. The system of claim 1, wherein the optical network includes amplifiers configured to maintain the optical power level over the first communications link within a predetermined range.

* * * * *